(12) United States Patent
Veenstra

(10) Patent No.: US 10,704,764 B2
(45) Date of Patent: Jul. 7, 2020

(54) LIGHT ASSEMBLY INCLUDING LINEAR LENS

(71) Applicant: Innotec, Corp., Zeeland, MI (US)

(72) Inventor: Thomas J. Veenstra, Lakewood, CO (US)

(73) Assignee: INNOTEC, CORP., Zeeland, MI (US)

( * ) Notice: Subject to any disclaimer, the term of this patent is extended or adjusted under 35 U.S.C. 154(b) by 0 days.

(21) Appl. No.: 16/323,646

(22) PCT Filed: Aug. 9, 2017

(86) PCT No.: PCT/US2017/046017
§ 371 (c)(1),
(2) Date: Feb. 6, 2019

(87) PCT Pub. No.: WO2018/031613
PCT Pub. Date: Feb. 15, 2018

(65) Prior Publication Data
US 2019/0170322 A1 Jun. 6, 2019

Related U.S. Application Data

(60) Provisional application No. 62/374,211, filed on Aug. 12, 2016.

(51) Int. Cl.
*F21V 5/04* (2006.01)
*G02B 19/00* (2006.01)
(Continued)

(52) U.S. Cl.
CPC ............... *F21V 5/04* (2013.01); *F21V 5/007* (2013.01); *G02B 6/0068* (2013.01);
(Continued)

(58) Field of Classification Search
CPC .. G02B 6/0038; G02B 6/0036; G03B 3/0037; G03B 1/133615; G03B 1/133555; G03B 1/133605; G03B 1/133606
See application file for complete search history.

(56) References Cited

U.S. PATENT DOCUMENTS 9,864,128 B2 * 1/2018 Takagi ................. G02B 6/0068
9,903,997 B2 * 2/2018 Wang ................... G02B 6/0038
(Continued)

FOREIGN PATENT DOCUMENTS

WO 2011130718 10/2011

OTHER PUBLICATIONS

International Search Report and Written Opinion from PCT/US2017/046017 dated Oct. 18, 2017.

*Primary Examiner* — Anabel Ton
(74) *Attorney, Agent, or Firm* — Warner Norcross + Judd LLP

(57) ABSTRACT

A light assembly including a light pipe and a plurality of light sources. The light pipe is an elongated, single, unitary piece having a generally linear light-exiting surface along one edge. The light pipe includes a plurality of lens portions along its length. Each lens portion forms a portion of the light existing surface. Each light source is associated with one of the lens portions to emit light into the lens portion and, therefore, the light pipe as a whole. The light from the light sources mixes within the light pipe before exiting the light pipe through the light-exiting surface in a generally linear pattern.

5 Claims, 4 Drawing Sheets

(51) Int. Cl.
*F21V 5/00* (2018.01)
*F21V 8/00* (2006.01)
*F21Y 115/10* (2016.01)

(52) U.S. Cl.
CPC ..... *G02B 19/0028* (2013.01); *G02B 19/0066* (2013.01); *F21V 2200/10* (2015.01); *F21Y 2115/10* (2016.08)

(56) References Cited

U.S. PATENT DOCUMENTS

| | | | |
|---|---|---|---|
| 10,078,168 B2 * | 9/2018 | Nakashima | G02B 6/0073 |
| 10,094,965 B2 * | 10/2018 | Tsai | G02B 6/0035 |
| 2003/0235047 A1 | 12/2003 | Choi et al. | |
| 2005/0276566 A1 * | 12/2005 | Iimura | G02B 6/0018 |
| | | | 385/146 |
| 2006/0139580 A1 | 6/2006 | Conner | |
| 2008/0174715 A1 * | 7/2008 | Suh | G02B 6/0088 |
| | | | 349/60 |
| 2009/0040789 A1 | 2/2009 | Maeda et al. | |
| 2010/0002169 A1 | 1/2010 | Kuramitsu et al. | |
| 2012/0313534 A1 | 12/2012 | Urtiga et al. | |
| 2018/0088270 A1 * | 3/2018 | Tuohioja | G02B 6/0045 |
| 2018/0294389 A1 * | 10/2018 | Tarsa | F21V 5/045 |

\* cited by examiner

US 10,704,764 B2

LIGHT ASSEMBLY INCLUDING LINEAR LENS

BACKGROUND OF THE INVENTION

The present invention relates to light assemblies, and more particularly to light assemblies providing a linear or two-dimensional output.

LEDs (light emitting diodes) have become an increasingly popular choice for lighting sources due to their high efficiency and long expected lifetime. LEDs however are point sources of light and, as a result, produce harsh, high-glare light patterns. LEDs also can product undesirable shadowing and "hot spots" (i.e. areas of relatively intense illumination) on the illuminated surface. These issues are particularly noticeable and problematic when the illuminated surface is a critical surface, such as a work surface or a product display.

In view of the foregoing issues, the light from the LEDs may be mixed before emission from a light assembly or luminaire. A variety of methods are available for providing mixing, also known as secondary mixing, and emitting the light in a linear pattern. The most traditional method is to include a secondary lens including diffusing optics, diffusing geometries, or both. Another traditional method includes edge lighting a light pipe and then extracting the light through a surface perpendicular to the light-injection surface. This method often is used for backlit displays such as LCD (liquid crystal display) screens.

However, these methods typically require the LEDs to be spaced closely together in order to work effectively. As a result, these methods require a greater number of LEDs than is necessary to meet the total light emission objectives of the light assembly.

SUMMARY OF THE INVENTION

The aforementioned issues are addressed by the present invention, which provides even light in a linear pattern using relatively few light sources. The invention includes a light pipe and a plurality of light sources. The light pipe is an elongated, single, unitary piece having a light-exiting surface along one edge. The light pipe includes a plurality of lens portions along its length. Each light source is associated with one of the lens portions to emit light into the lens portion and, therefore, the light pipe as a whole. The light from the light sources mixes within the light pipe before exiting the light pipe through the light-exiting surface in a linear pattern.

DESCRIPTION OF THE CURRENT EMBODIMENT

Figure 1:
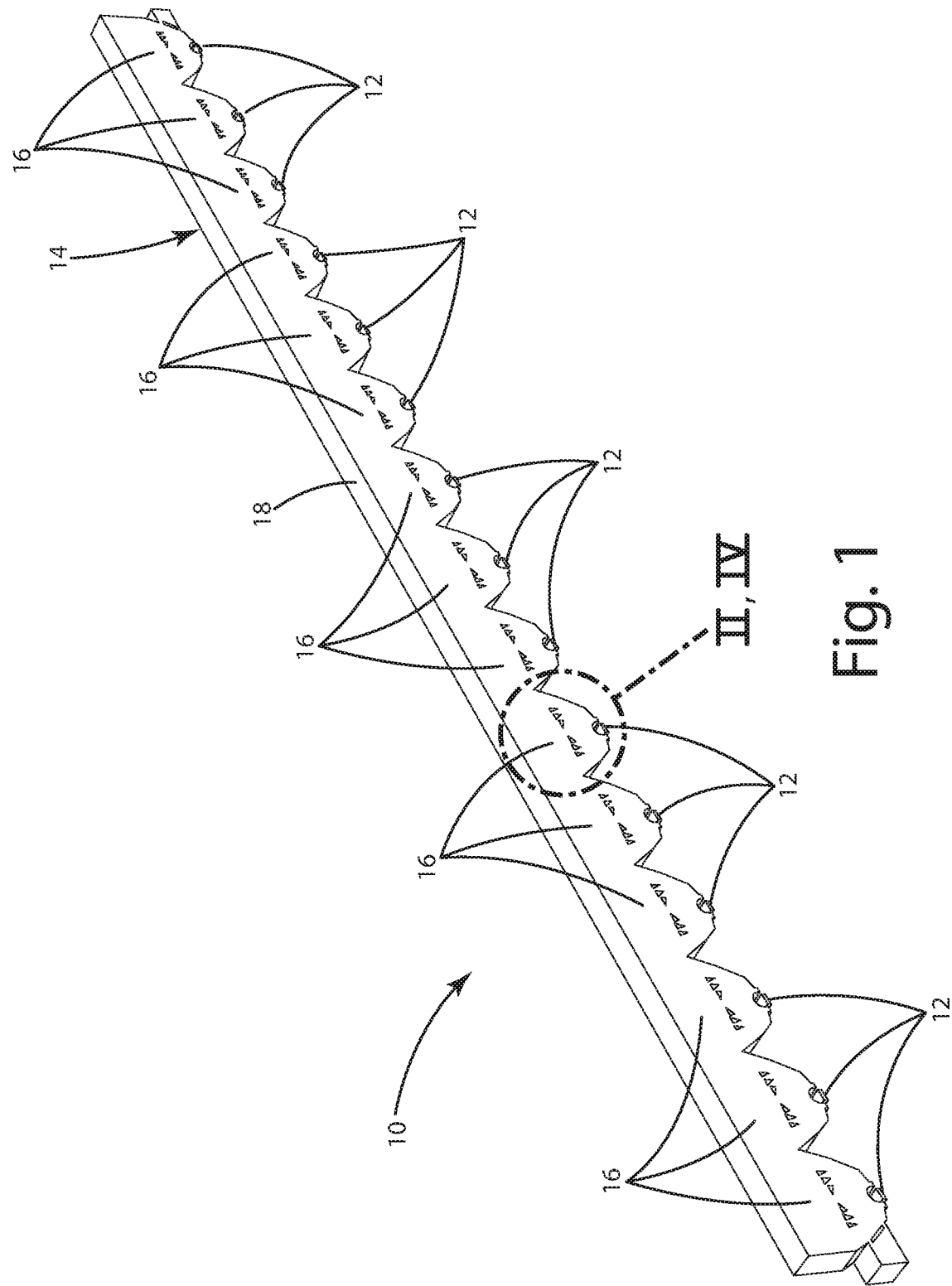
FIG. 1 is a perspective view of the light assembly according to a current embodiment of the present invention.

A light assembly or luminaire in accordance with a current embodiment of the invention is illustrated in the drawings and generally designated 10. The light assembly 10 includes a plurality of light sources 12 and a light pipe 14.

Each light source 12 in the current embodiment is an LED (light emitting diode). Each light source could be virtually any other light source now known or later developed. It also is possible for the light sources 12 to be of different types within a single light assembly 10. Each light source 12 is positioned to project light into the light pipe 10 as will be described.

The light pipe 14 may be an elongated, single, unitary, integral piece. The light pipe 14 may be fabricated of any suitable material now known or later developed to convey light. As illustrated, the light pipe 14 is generally straight. Alternatively, the light pipe 14 may be curved, angled at one or more points, or otherwise shaped to provide a non-straight linear configuration.

Figure 3:
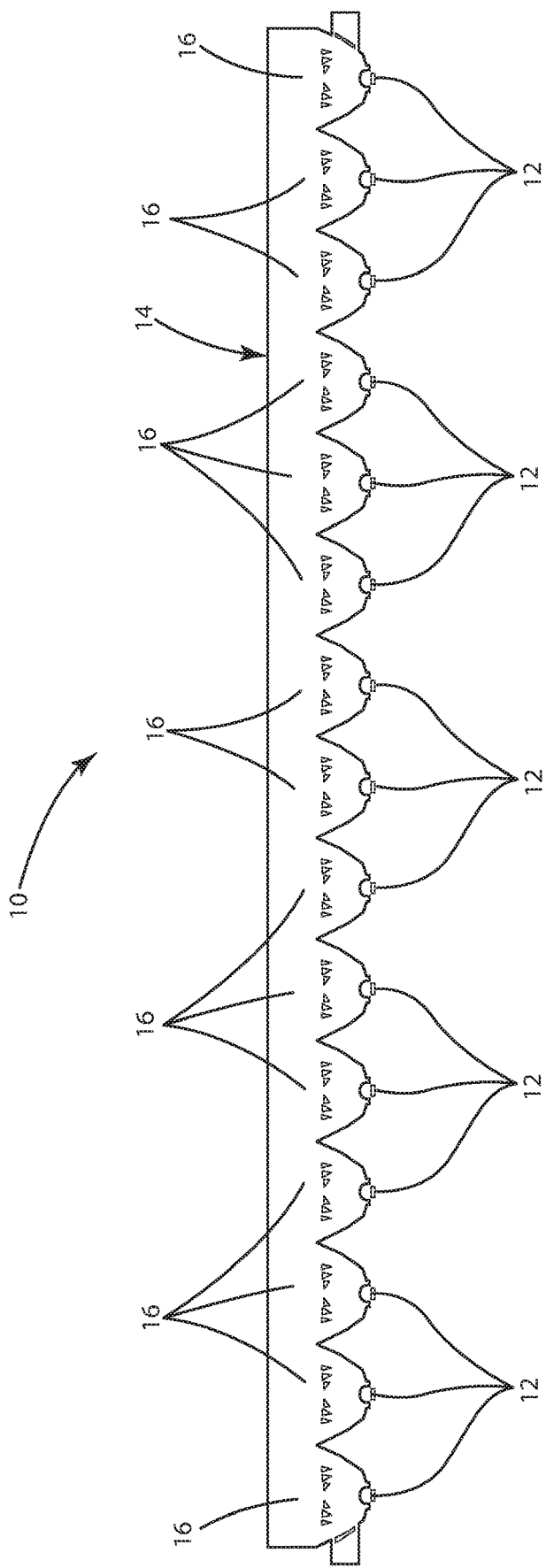
FIG. 3 is a plan view of the light assembly.

As seen in FIGS. 1 and 3, the light pipe 14 includes a plurality of lens portions 16 along its length. Each lens portion 16 is integral with the adjacent lens portions. The light pipe 14 as illustrated in FIGS. 1 and 3 includes fifteen lens portions 16. Different numbers of lens portions 16 may be included.

The light pipe 14 includes a light-exiting surface 18 along one edge. The surface 18 is continuous and provides an output surface for the collective lens portions 16. The light-exiting surface 18 is generally opposite the light sources 12. In the current embodiment, the surface 18 is designed to scatter the light in three dimensions. This effect may be accomplished through small geometries such as, but not limited to, facets, texturing, or a secondary scattering material.

Figure 2:
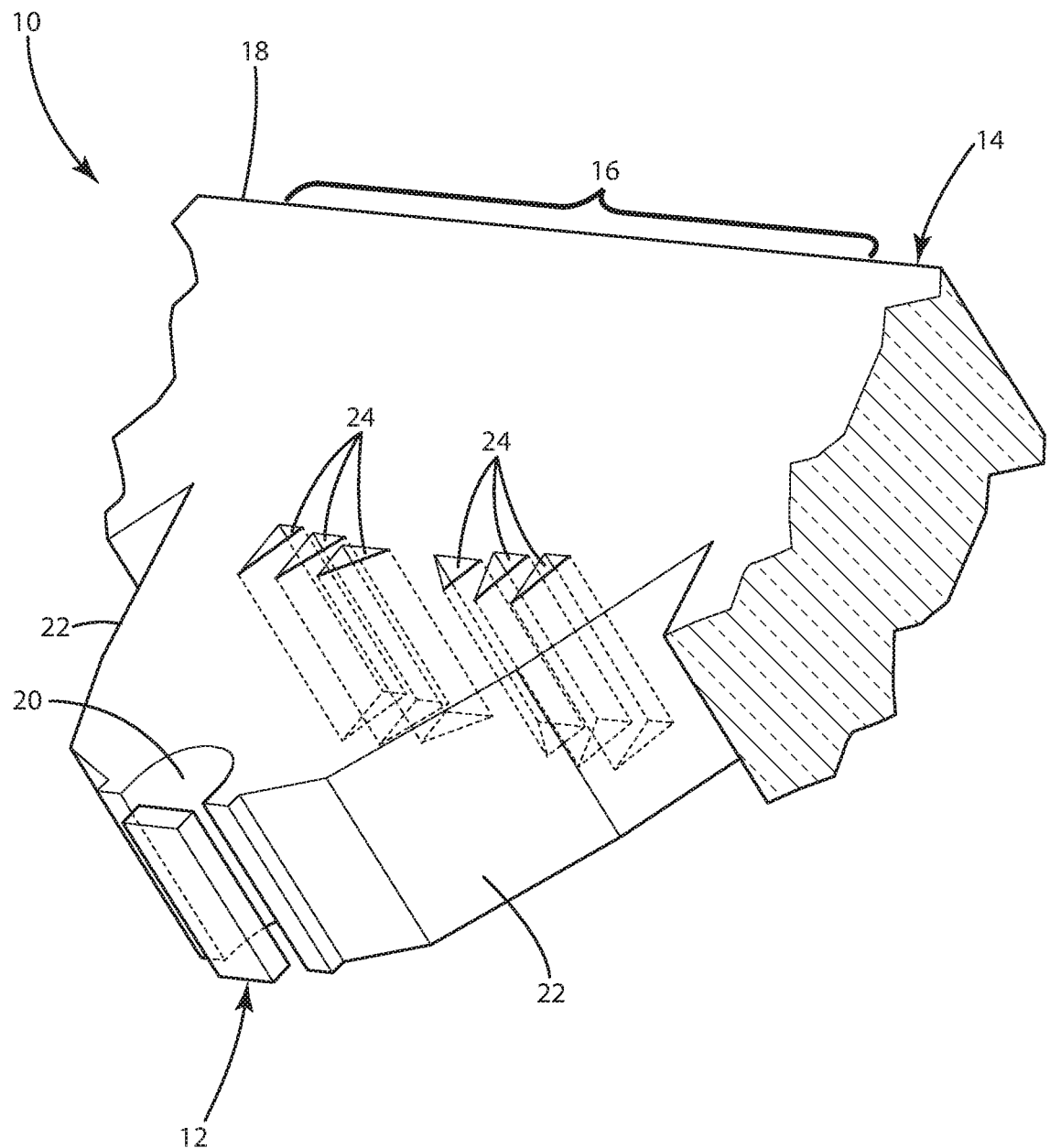
FIG. 2 is an enlarged perspective view, partially broken, of the area within circle 2 of FIG. 1, showing one lens portion and one light source of the light assembly.
Figure 4:
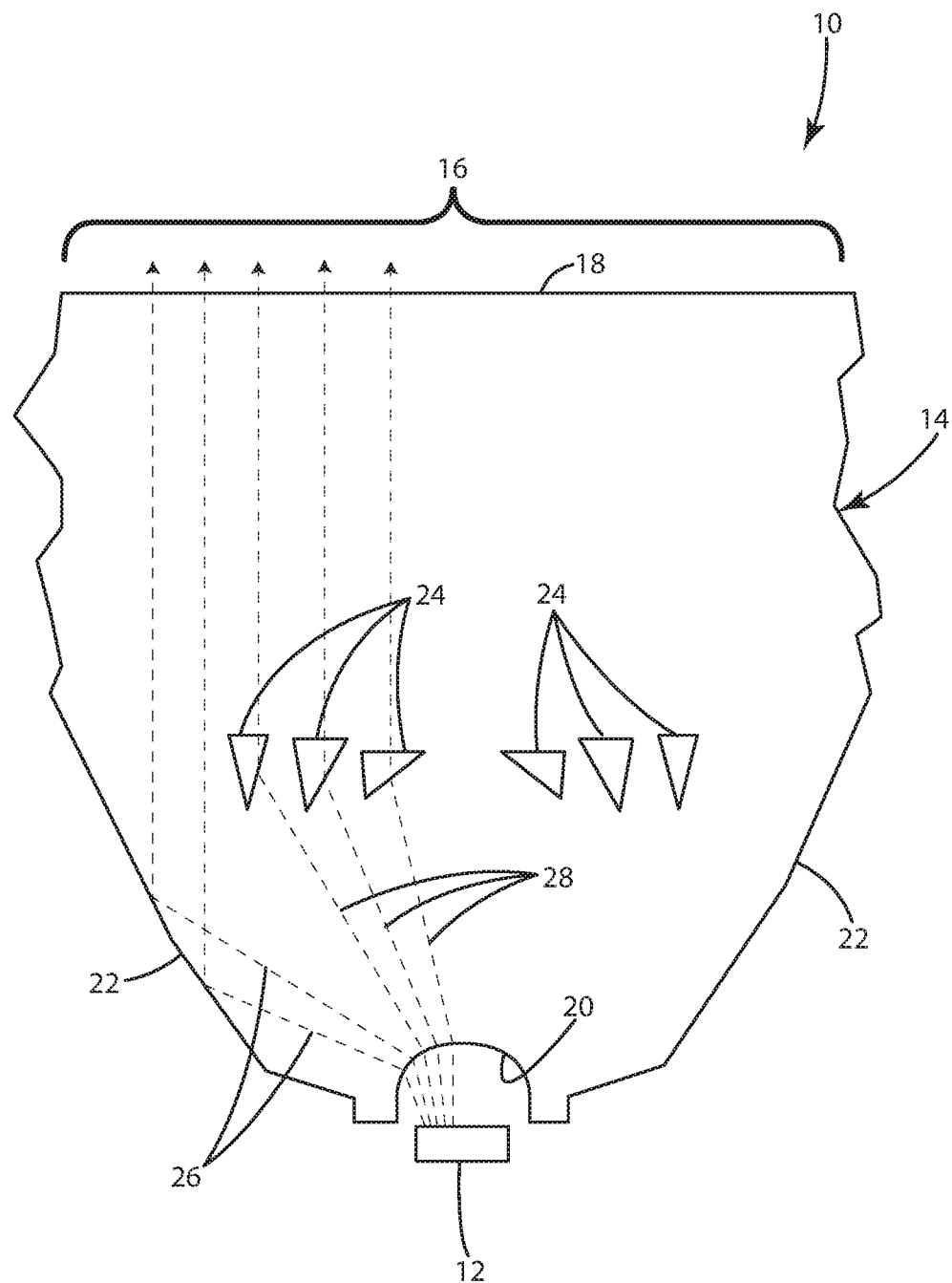
FIG. 4 is a plan view, partially broken, of one lens portion and one light source of the light assembly.

A single lens portion 16 is illustrated in FIGS. 2 and 4 in conjunction with a light source 12. Each lens portion 16 includes a light injection surface 20, a pair of reflecting surfaces 22, a series of redirecting features 24, and a portion of the previously described light-exiting surface 18.

The light injection surface 20 is generally adjacent the light source 12. The light injection surface 20 is concave in a direction away from the light source 12. More generally, the light injection surface 20 is configured in a way to absorb a substantial portion of the light emitted by the light source 12. Again more generally, the light injection surface 20 is configured in a way to distribute the received light in a predictable pattern (e.g. to the left and the right as viewed in FIGS. 2 and 4) within the lens portion 16.

A reflecting surface 22 extends along each side of the lens portion 16 (e.g. to the left and the right as viewed in FIGS. 2 and 4) from the light injection surface 20. The reflecting surfaces 22 reflect or otherwise interfere with the light 26 traveling substantially left and right to redirect the light to travel in a direction generally perpendicular to the light-exiting surface 16. The reflecting surfaces 22 preferably are contoured in such a way as to create an even distribution of light intensity across the light-exiting surface 16.

In the disclosed embodiment, the redirecting features 24 may be voids in the light pipe 14. The redirecting features 24 refract or otherwise interfere with the light 28 traveling from the light injection surface 20 to redirect the light to travel in a direction generally perpendicular to the light-exiting surface 16. The redirecting features 24 and the reflecting surfaces 22 preferably are contoured in such a way as to create an even distribution of light intensity across the light-exiting surface 16. While six triangular redirecting features 24 are illustrated in the drawings, redirecting features of different numbers and/or different configurations may be included depending on the desired performance and effects. Further, while the redirecting features 24 of the current embodiment comprise voids in the light pipe 14, the redirecting features could be suitable alternatives now known or later known to one skilled in the art.

As perhaps best illustrated in FIG. 2, the geometric pattern or shape of each lens portion 16 may be substantially symmetrical across the projection axis of the light source 12.

As illustrated in FIGS. 1 and 3, the lens portions 16 may be repeated in a linear sequence along the light pipe 14. While fifteen lens portions 16 are illustrated in FIGS. 1 and 3, greater or fewer lens portions may be included depending on the application. While the lens portions 16 are illustrated as being substantially identical to one another, the lens portions may vary in size and shape along the light pipe 14.

The light (e.g. 26 and 28) from the multiple light sources 12 is combined so that the light is emitted as a generally continuous, generally even emission along the length of the light-exiting surface 18 of the light pipe 14. The light emission pattern may be engineered to be a homogeneous distribution in both (a) light density along the length of the light pipe 14 and (b) light directionality along the length of the light pipe 14. In other words, at any given point along the light-exiting surface 18, the light may be emitted in substantially the same intensity and angular distribution pattern as at all other points along the light-exiting surface 18.

The above description is that of a current embodiment of the invention. Various alterations and changes can be made without departing from the spirit and broader aspects of the invention as defined in the appended claims, which are to be interpreted in accordance with the principles of patent law including the doctrine of equivalents.

This disclosure should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein.

The phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "front," "back," "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The invention claimed is:

1. A light assembly comprising:
    an elongated, single-piece, unitary light pipe having a length and including a plurality of lens portions along the length, the light pipe having a generally linear light-exiting surface defining a first direction; and
    a plurality of light sources, each light source associated with one of the lens portions for directing light into the associated lens portion for ultimate exit through the light-exiting surface;
    each of the lens portions forming a portion of the light-exiting surface, each lens portion including:
        a light injection surface adapted to receive light from an associated light source, each light injection surface being concave to distribute light from the associated light source;
        a reflector portion adapted to reflect a first portion of the distributed light from the associated light source (a) in a second direction generally perpendicular to the first direction of the light-exiting surface and (b) to the light-exiting surface; and
        redirecting features adapted to redirect a second portion of the light from the associated light source to travel in the second direction to the light-exiting surface, wherein the reflector portion and the redirecting features are contoured in such a way as to create an even distribution of light intensity across the light-exiting surface.

2. A light assembly comprising:
    an elongated, single-piece, unitary light pipe having a length and including a plurality of lens portions along the length, the light pipe having a generally linear light-exiting surface; and
    a plurality of light sources, each light source associated with one of the lens portions for directing light into the associated lens portion for ultimate exit through the light-exiting surface; and
    each of the lens portions forming a portion of the light-exiting surface, each lens portion including a light injection surface adapted to receive light from an associated light source, each light injection surface being concave to distribute light from the associated light source, each lens portion including a reflector portion adapted to reflect a first portion of the distributed light from the associated light source to the light-exiting surface, each lens portion including redirecting features adapted to redirect a second portion of the light from the light source to the light-exiting surface, the redirecting features comprising voids in the light pipe.

3. A light assembly as defined in claim 1 wherein the lens portions are generally identical to one another.

4. A light assembly as defined in claim 1 wherein each light source comprises an LED (light emitting diode).

5. A light assembly as defined in claim 1 wherein the light pipe and the light-exiting surface are generally straight.

\* \* \* \* \*